United States Patent [19]

Henault

[11] 4,018,190

[45] Apr. 19, 1977

[54] METHOD OF AND APPARATUS FOR FEEDING HYDROGEN FUEL TO ENGINES

[75] Inventor: Claude Henault, Chevilly Larue, France

[73] Assignees: Regie Nationale des Usines Renault; Automobiles Peugeot, both of France

[22] Filed: May 20, 1975

[21] Appl. No.: 579,294

[30] Foreign Application Priority Data

May 24, 1974 France .............................. 74.18135

[52] U.S. Cl. ..................................... 123/3; 23/281; 123/DIG. 12; 165/104 F
[51] Int. Cl.² .......................................... F02B 43/08
[58] Field of Search .... 123/1 A, 3, 119 E, DIG. 12; 23/281; 48/61; 423/648; 165/104 F

[56] References Cited

UNITED STATES PATENTS

| 2,642,340 | 6/1953 | Martin | 23/281 |
|---|---|---|---|
| 3,291,572 | 12/1966 | Fatica | 23/281 |
| 3,299,947 | 1/1967 | Boucraut et al. | 165/104 F |
| 3,313,598 | 4/1967 | Gluckstein | 423/648 |
| 3,323,873 | 6/1967 | Horn et al. | 23/281 |
| 3,495,654 | 2/1970 | Jacubowiez | 165/104 F |
| 3,607,066 | 9/1971 | Basch et al. | 23/281 |
| 3,676,071 | 7/1972 | Speed | 423/648 |
| 3,682,142 | 8/1972 | Newkirk | 123/DIG. 12 |
| 3,898,043 | 8/1975 | Schutte et al. | 165/104 F |
| 3,918,412 | 11/1975 | Lindstrom | 123/3 |

Primary Examiner—C. J. Husar
Assistant Examiner—David D. Reynolds
Attorney, Agent, or Firm—Beveridge, DeGrandi, Kline & Lunsford

[57] ABSTRACT

A method of and an apparatus for feeding hydrogen fuel derived from a metal hydride to an internal combustion engine includes two tanks, one for containing fresh hydride and the other for spent hydride and a low capacity reactor through which the fresh hydride is pumped from the one tank to the other. Heat applied to the small quantity of hydride in the reactor generates hydrogen which is extracted and retained in a storage chamber for feeding to an engine, with the spent hydride being pumped away and fresh hydride being pumped into the reactor to maintain a continuous source of supply of hydrogen therein during operation of the system. Quick starts and stops are made possible and great flexibility of operation and control are obtained by circulation of the hydride through the small reactor for heating.

19 Claims, 4 Drawing Figures

METHOD OF AND APPARATUS FOR FEEDING HYDROGEN FUEL TO ENGINES

BACKGROUND OF THE INVENTION

1. Field of the Invention

This invention relates to a method and apparatus for feeding fuel to heat engines, in particular to internal combustion engines which operate on hydrogen.

2. Description of the Prior Art

The problems of atmospheric pollution, and more recently the energy crisis, have given increasing importance to research into overcoming the problems by the use of hydrogen as a fuel. In fact, it has been known for a long time that hydrogen can be used as a fuel, and, in the field of pollution, it constitutes the fuel producing the smallest discharge of pollutants, such as carbon monoxide and hydrocarbons. The exhaust gases from hydrogen combustion consist exclusively of water vapor apart from oxides of nitrogen which can easily be eliminated. Furthermore, hydrogen has a very high calorific value (29 kcal/kg). On the other hand, the increased net cost of hydrogen and its low volumetric weight in the gaseous form have hitherto prevented hydrogen from being extensively used as a fuel, especially in motor vehicles.

On the other hand, it is known to store hydrogen in the form of metal hydrides in the solid state, particularly magnesium hydride which delivers 70g of gaseous hydrogen per kg of hydride. Magnesium hydride, which is stable at ordinary temperatures, liberates its hydrogen content around 240° C at pressures which increase with temperature. The hydride can be regenerated by hydrogenation under pressure, the hydrogenation proceeding the more readily the more finely divided is the powder of base metal.

The known devices for producing hydrogen from metal hydrides in a motor vehicle consist essentially of a tank in which the hydride is heated. Such devices have the disadvantage of a large thermal inertia which, on the one hand, makes the vehicle extremely slow to start up and, on the other hand, makes the hydrogen production continue for a certain time after heating has ceased when the engine of the vehicle is stopped. The arrangement therefore completely lacks the requisite flexibility for commercial acceptance. A further difficulty arises in that if the hydrogen is injected directly into the combustion chambers of the engine the hydrogen pressure must constantly be sufficient. The high thermal inertia of the known arrangements makes it practically impossible to adjust the hydrogen pressure by control of the heating power.

SUMMARY OF THE INVENTION

The object of the present invention is to remove the disadvantages mentioned above by providing a method and apparatus for feeding hydrogen to engines, as a fuel, the arrangement being highly flexible in operation and allowing rapid starts and stops to be made. The invention also makes it possible to control the pressure at which the hydrogen is supplied to the engine.

According to the invention two tanks are used, one for fresh hydride, the other for spent hydride, and a small reactor into which fresh hydride is charged from the first tank. The spent hydride is discharged from the reactor to the second tank. Heating is limited to the small quantity of hydride in the reactor, providing great flexibility of operation and ease of control. Hydrogen is produced in the reactor under pressure and pumped under increased pressure into a pressure storage tank which acts as a reservoir and buffer.

The circulation of the granular or powdery hydride, both fresh and spent, is facilitated by utilizing the principle of fluidization, the fluidizing gas being, of course, hydrogen. The fluidizing hydrogen is also used in the reactor to transfer heat to the hydride, through which it circulates constantly.

BRIEF DESCRIPTION OF THE DRAWINGS

Embodiments of the invention will now be described, by way of example, with reference to the accompanying drawings, in which.

DESCRIPTION OF THE PREFERRED EMBODIMENTS

Figure 1:
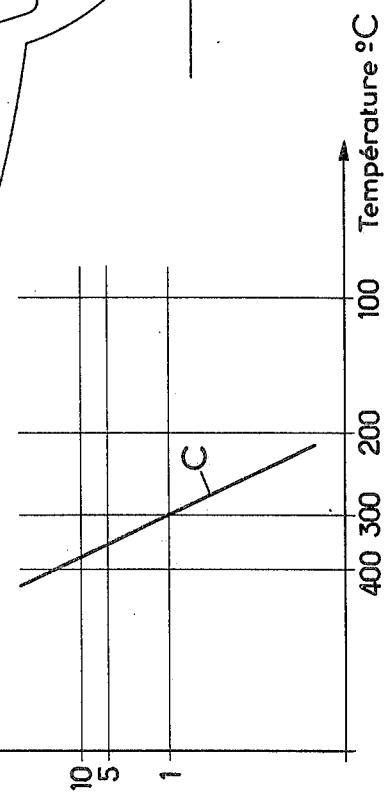
FIG. 1 is a curve showing the variation of gaseous hydrogen pressure in equilibrium with the hydride, with changes in temperature.

With reference to FIG. 1, when the hydride is heated to approximately 350° – 400° C, gaseous hydrogen is produced at a hydrogen pressure of 5 – 10 kg/cm$^2$. As soon as this equilibrium pressure is reached, the production of hydrogen ceases.

Figure 2:
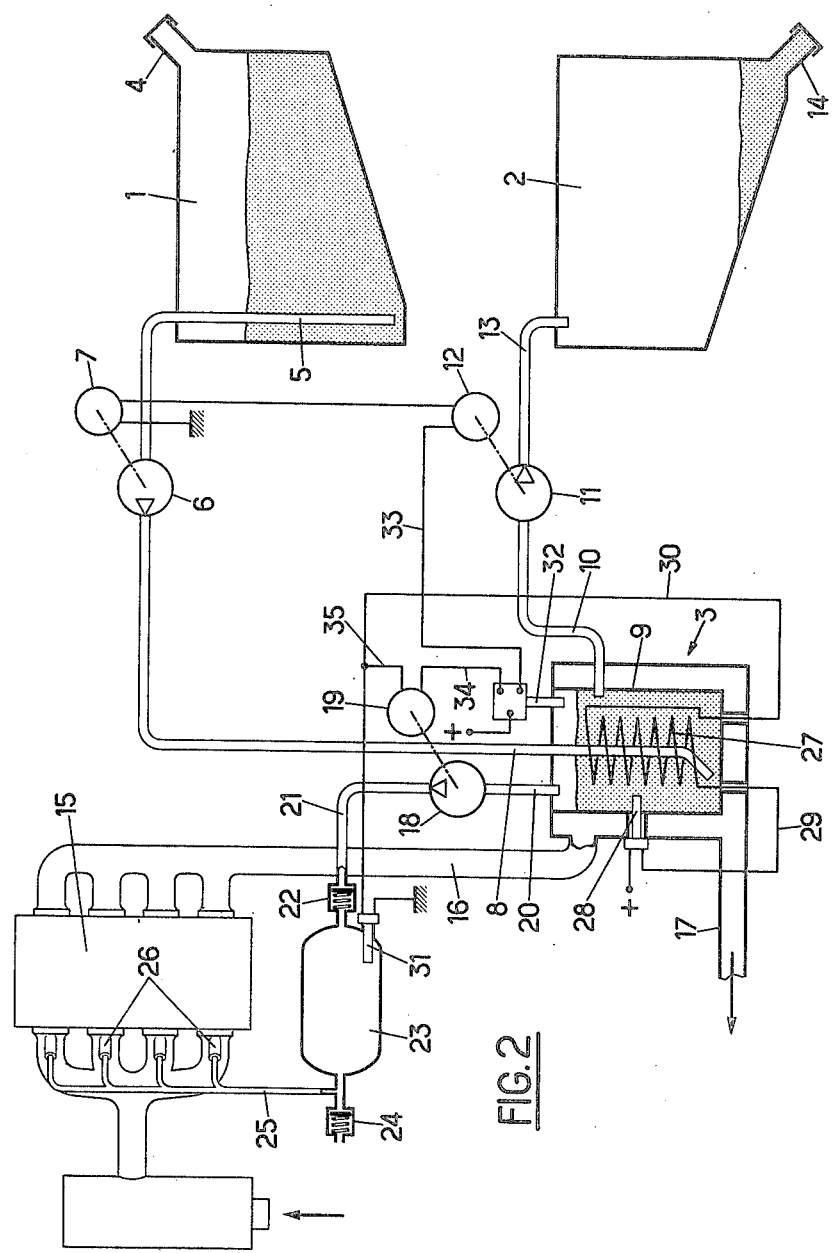
FIG. 2 represents diagrammatically apparatus according to the invention.

In FIG. 2 a storage tank 1 contains fresh granular or powdery hydride which has been introduced through a filling connection 4. The hydride is removed from the tank 1 through an outlet pipe 5 by a pump 6 which is powered by an electric motor 7. The pump delivers the hydride through a pipe 8 to the bottom of an inner chamber 9 of a reactor 3. Excess hydride is removed from the inner chamber of the reactor through an overflow pipe 10 by a pump 11 driven by an electric motor 12, which discharges the spent hydride through a pipe 13 from the top portion of the reactor chamber into a second tank 2, which is a storage tank for spent hydride. The spent hydride remains in the tank 2 until ultimately removed through an emptying connection 14. Thus the tanks 1 and 2 cooperate with each other in the sense that while tank 1 is being progressively emptied, tank 2 progressively fills up.

In this embodiment of the present invention, only the small quantity of hydride in the inner chamber of the reactor 3 is heated, preferably by exhaust gases from the engine 15. The exhaust manifold of the engine is connected by a pipe 16 to a double-walled outer chamber surrounding the inner chamber 9 of the reactor. The exhaust gases are extracted from the outer chamber and fed to the exhaust outlet via a pipe 17. A pump or compressor 18, driven by an electric motor 19, sucks the hydrogen out of the reactor through a pipe 20. The hydrogen is produced under pressure in the reactor 3, and the pump 18 delivers the hydrogen, at increased pressure, through a delivery pipe 21 and a nonreturn valve 22, to a pressure storage tank 23 equipped with a safety valve 24. The engine 15 takes gaseous hydrogen from the pressure tank 23 through a feed tube manifold 25, the hydrogen being injected under pressure into the cylinders of the engine by injectors 26.

The pressure tank 23 acts as a reserve, in that, after the engine has been stopped, the tank 23 is, in principle, full. This reserve can be used for restarting the engine, the next time the engine is used, the reserve being effective for a sufficiently long time for the exhaust gases to become hot enough to start up the reactor 3 again. For safety's sake, in the expectation that in some cases the reserve 23 would be insufficient, an auxiliary electric resistance heater 27 is provided which can be used for heating the hydride in the reactor during the starting-up period.

The installation can be controlled in a simple manner as shown in FIG. 2. Two electric terminals marked + are connected, in the conventional manner, to the car battery through the ignition contact (not shown). A temperature sensor 28 penetrates through the double wall of the reactor 3. If the temperature of the hydride in the inner chamber of the reactor is insufficient to produce the necessary flow of hydrogen, the temperature sensor 28 closes the electric circuit, causing current to flow via a conductor 29, through a heater resistance 27 and via a conductor 30 to a pressure switch 31 in the pressure tank 23 and so to ground. The electric heater 27 is connected in series with the switch 28, which is the temperature sensor, and the pressure switch 31, so that the heater 27 is not energized either during starting of the engine as long as there is sufficient pressure in the pressure tank 23, irrespective of the temperature of the hydride in the inner chamber of the reactor 3, or as long as the reactor 3 is hot, whatever the pressure in the tank 23.

Another pressure switch 32 is located in the inner chamber 9 of the reactor 3 and is connected such that when the pressure in the reactor drops below a threshold level the pressure switch 32 connects the second + terminal to a line 33, supplying electric current to the two electric motors 7 and 12, for supplying fresh hydride to the reactor and for removing spent hydride from it. Inversely, as soon as the pressure in the reactor has risen above the threshold level, the pressure switch 32 de-energizes the two motors 7 and 12, and instead feeds electric current via a lead 34 to the motor 19 which drives the hydrogen compressor 18. The motor current flows via leads 35 and 30 and via the pressure switch 31 to ground. In this way, the compressor 18 compresses the hydrogen in the tank 23 only when two conditions are satisfied, namely that the pressure in the pressure tank 23 is insufficient and the pressure in the inner chamber 9 is sufficiently high.

Regulation of the pressure in the inner chamber 9 of the reactor 3 could be obtained by using the equilibrium curve of FIG. 1, directly regulating the temperature of the reactor. For that purpose, a by-pass could be provided between the exhaust pipes 16 and 17 to reduce the heating when the temperature becomes excessive. The by-pass valve could be, for example, controlled by reduced pressure and by the use of an electric valve energized via the conductor 29, in such a way as to close the by-pass when the temperature is insufficient. This control would suffer from thermal inertia, as mentioned above, but the latter would be limited to the small amount of hydride contained in the inner chamber 9 and not to the total quantity of hydride in circulation.

However, it is possible to eliminate thermal inertia entirely by using pressure regulation brought about solely by the feeding of hydride in the manner shown in FIG. 2. In this case, the reactor 3 is heated to a constant temperature equal to, or greater than, the equilibrium temperature corresponding to the desired pressure, but as soon as the required pressure is attained at the pressure switch 32, the feeding of hydride by the pump 6 is arrested so that the equilibrium is never attained. This method of control provides immediate response and allows a high degree of flexibility.

The pumps 6 and 11 which are used for transferring metallic powders (i.e. the hydride) can be of any kind suitable for the transfer of powders, for example worm pumps. However, it is particularly advantageous to obtain the transfer of powders, in the manner of the example shown in FIGS. 3 and 4, by the technique known as fluidization. This consists in blowing a gas into the base of the chamber containing the granular or powdery material to maintain the material in suspension, so that it can be sucked out, pumped and conveyed like a liquid.

Figure 3:
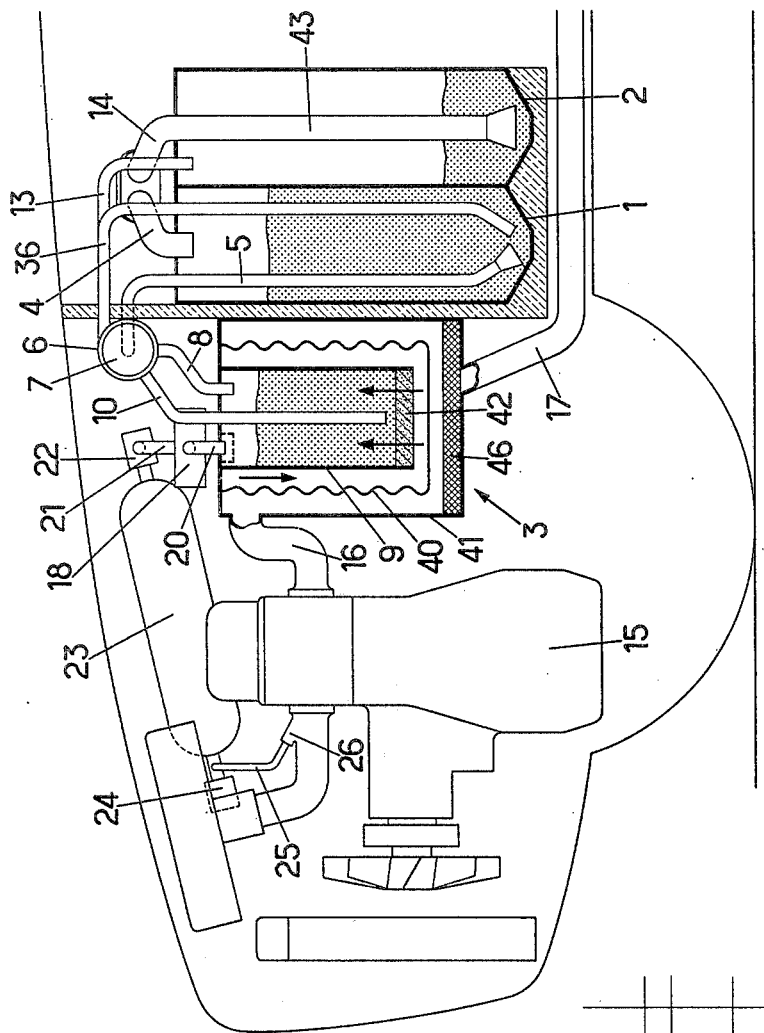
FIG. 3 is a diagrammatic longitudinal section of apparatus according to the invention installed in a motor vehicle.
Figure 4:
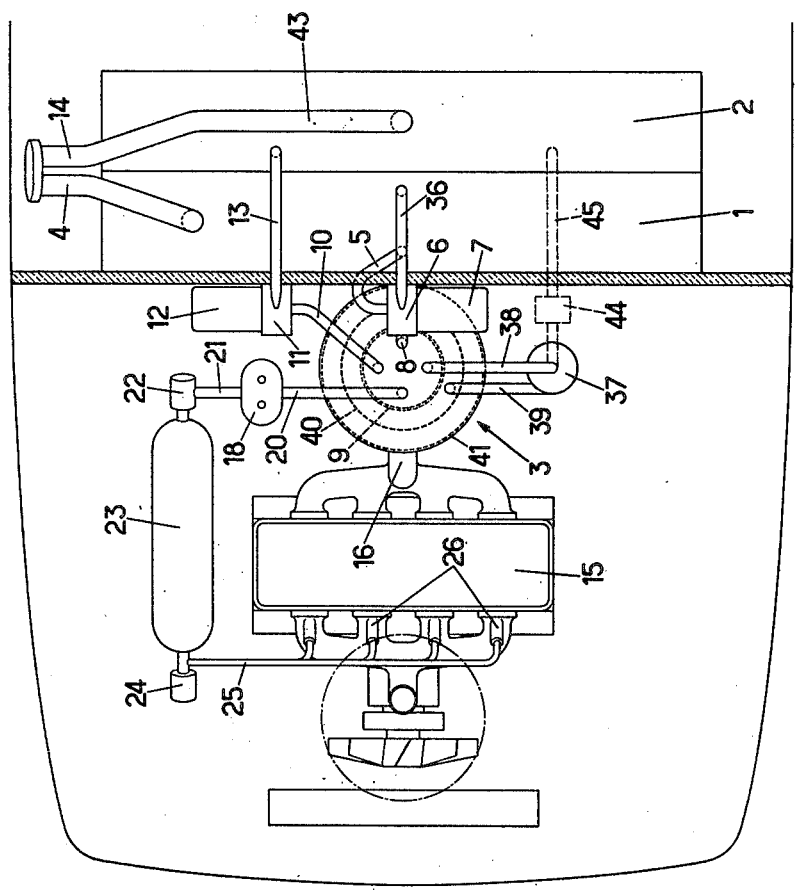
FIG. 4 is a plan view of the apparatus of FIG. 3.

In FIGS. 3 and 4 are shown the basic elements of the method described above, and in particular the two hydride reservoirs 1 and 2 which are preferably disposed at the rear of the engine compartment, and preferably extend over substantially the entire width of the vehicle. The pump 6, which may be a centrifugal pump, sucks fresh hydride, through a pipe 5, from the bottom of the reservoir 1, which is in the form of a hopper. The hydride powder sucked by the pump flows by gravity into the reactor 3 via a pipe 8, while the hydrogen moved by this pump returns via a pipe 36 to the base of the reservoir 1 to continue to fluidize the bed of powder. A supplementary pump 37, which may be a centrifugal pump, sucks gaseous hydrogen through a screen to the upper part of the inner chamber 9 of the reactor 3 via a pipe 38, and blows it through a pipe 39 to the upper part of the annular space between the inner chamber 9 and an intermediate wall 40. The wall 40 is preferably corrugated or provided with ribs to promote heat transfer with the exhaust gases which arrive via the pipe 16 and circulate in the space between this wall 40 and the external wall 41 of the reactor 3 before escaping through the pipe 17.

As indicated by the arrows in FIG. 3, the gaseous hydrogen flows downwards through the annular space between the chamber 9 and the wall 40 and then passes upwards through the screen or porous wall 42 which forms the bottom of the inner chamber 9. The stream of hot hydrogen rising upwards through the mass of granular or powdery hydride in the inner chamber 9 fulfills two functions. In the first place the stream of hydrogen fluidizes the bed of hydride so that spent hydride can be pumped to the tank 2 by the pump 11. Secondly, the hydride is uniformly heated due to the temperature of the stream of hydrogen, which has been heated by the exhaust gases while flowing downwards between the chamber 9 and the wall 40. The pump 37 therefore operates continuously for fluidizing and heating the bed of hydride.

Due to this circulation of hot hydrogen through the mass of hydride contained in the reactor, the hydride is drained of hydrogen systematically starting from the bottom, so that it will be the lower layers of hydride which are exhausted first, while the upper layers which are fed directly with fresh hydride through the pipe 8 will be the most rich in hydrogen. For this reason, in this embodiment the hydride return pipe 10 sucks the hydride from the lower part of the fluidized bed, and the pump 11 returns the used hydride to the reservoir 2 via the pipe 13.

The reservoir 1 is replenished with fresh hydride via the orifice 4 as mentioned above, but for a practical reason the emptying of the reservoir 2 is effected by sucking through a pipe 43 extending to the bottom of the reservoir 2 and communicating with an orifice 14 coupled to the pipe 43. After the hydride in the tank 1 is exhausted, the vehicle is driven to a special service station which simultaneously refills the reservoir 1 via the orifice 4 and empties the reservoir 2 by suction through the orifice 14, this replenishing being effected entirely in a hydrogen atmosphere while preventing any air from entering the reservoirs. The spent hydride is then transported by return freight, without extra cost, to regeneration stations by vehicles loaded with rehydrogenated hydride.

The pumps 6 and 11 are energized by a system similar to that of FIG. 2, the regulation of the quantity of hydride in the reactor 3 being maintained not by overflowing but by obstruction of the pipe 8 when its lower orifice is buried in the powder, the excess hydride in the pump 6 then being returned to the reservoir 1 via the pipe 36.

The arrangement according to the invention therefore allows, by means of the alternative functioning of the pumps 6 and 11 and of the compressor 18, the maintenance of a substantially constant hydrogen pressure in the reservoir 23 to provide convenient feeding of the engine 15.

When the engine is stopped, the mass of hydride in the fluidized bed, although a relatively small quantity, continues to produce hydrogen due to thermal inertia. In order to avoid an excessive build-up of pressure in the chamber formed by the reactor 3 and the reservoirs 1 and 2, the compressor 18 can be used to continue to pump the excess hydrogen into the tank 23.

Alternately, when the engine is stopped, the cooling of the hot hydride can be speeded up by temporarily connecting the suction from the pump 37, via a valve 44 and a pipe 45, to the upper part of the reservoir 2, so that the pump 37, by sending instantly a current of cold hydrogen through the fluidized bed in the reactor 3, produces almost instantaneous cooling of the hydride and therefore substantially immediate interruption of the production of hydrogen.

Means for reducing pollution from the engine 15 which is fed by the method and apparatus in accordance with the invention, comprises a catalyst reactor for reducing oxides of nitrogen. The catalytic reactor may be of known type and is not shown in the drawings. The reactor may be positioned in the exhaust system so that only water vapor, nitrogen and carbon dioxide remain at the outlet. In particular, the circulation path of the exhaust gases between the walls 40 and 41 of the reactor 3 may be used for containing the catalytic elements, especially in the form of a base plate 46 through which the exhaust gases pass after heating the heat exchange surface 40. The fuel used, which is substantially pure hydrogen, minimizes the risk of contamination of these catalytic elements. Finally, the double cooling of the exhaust gases by virtue of the heat exchange with the reactor 3 on the one hand and the endothermic action of the catalytic reduction on the other hand, brings the temperature of the gases at the outlet to a relatively low level, making this solution particularly suitable in an urban environment where the thermal pollution must be considered.

While I have disclosed preferred embodiments of my invention, I wish it understood that I do not intend to be restricted thereto but rather that I intend to include all embodiments apparent to one skilled in the art and which come within the spirit and scope of my invention.

What I claim is:

1. In a motor vehicle propulsion system including an internal combustion engine, a method of producing gaseous hydrogen from metal hydride and feeding the hydrogen as fuel to said engine during operation of the vehicle, said method comprising the steps of providing a supply of fresh hydride in a first tank, providing a second tank for receiving spent hydride, feeding the fresh hydride at a controlled rate from the first tank to a low-capacity reactor heating the hydride in the reactor to produce gaseous hydrogen, extracting the hydrogen from the reactor and supplying the hydrogen under pressure to the internal combustion engine, and withdrawing the spent hydride from said reactor and delivering it to the second tank.

2. The method as defined in claim 1 wherein the steps of feeding fresh hydride to the reactor and withdrawing the spent hydride from the reactor are performed simultaneously with the heating of hydride in the reactor whereby gaseous hydrogen may be produced on a continuous basis over a substantial period of time.

3. The method as defined in claim 2 further comprising the steps of flowing gaseous hydrogen into the hydride in the first tank and in the reactor to fluidize the hydride.

4. The method as defined in claim 3 wherein the step of heating the hydride in the reactor comprises the step of heating the gaseous hydrogen flowed therethrough by means of a heat exchanger operably connected to the engine's exhaust system whereby waste heat in the exhaust gases are employed to generate the gaseous hydrogen fuel.

5. The method as defined in claim 2 wherein the step of extracting the hydrogen from the reactor includes pumping the hydrogen under increased pressure into a reservoir from which the hydrogen is drawn for use as fuel for the engine.

6. The method as defined in claim 2 further comprising the steps of sensing the hydrogen pressure in the reactor, and controlling the feeding of fresh hydride thereto and the withdrawal of spent hydride therefrom in response to the sensed pressure.

7. The method as defined in claim 6 wherein the exhaust gases from an internal combustion engine fed in accordance with the method are employed to heat the hydride in the reactor.

8. In a motor vehicle propulsion system including an internal combustion engine, and apparatus for generating gaseous hydrogen from a metal hydride and for feeding the hydrogen as fuel to said internal combustion engine during operation of the vehicle, said apparatus comprising a lowcapacity reactor, first and second tanks, means for feeding fresh hydride at a controlled rate to said reactor from said first tank, means for removing spent hydride from said reactor and conveying it to said second tank, means for heating the hydride in said reactor, and means for extracting the hydrogen from said reactor and directing the extracted hydrogen to said internal combustion engine.

9. Apparatus according to claim 8, further comprising pressure sensing means for sensing the hydrogen pressure in said reactor, said means for feeding fresh hydride to the reactor and said means for removing spent hydride from the reactor being controlled by the hydrogen pressure in the reactor.

10. Apparatus according to claim 9 wherein said means for heating the hydride in said low-capacity reactor comprises heat exchange means operably connected to the engine's exhaust system for extracting heat from the exhaust gases.

11. Apparatus according to claim 10 further comprising an auxiliary heater for heating the reactor for starting the reactor up from the cold when the exhaust gases have not attained a sufficient temperature to heat the reactor.

12. Apparatus according to claim 11 wherein said auxiliary heater comprises an electrical resistance heater.

13. Apparatus according to claim 8 further comprising means directing fluidizing currents of hydrogen gas into the hydride in said first tank and said reactor, and centrifugal pump means for pumping fresh hydride from said first tank and spent hydride from said reactor.

14. Apparatus according to claim 8 further comprising a reservoir, pump means operably connected between said reservoir and said reactor for extracting hydrogen produced in the reactor and delivering it at increased pressure for storage in said reservoir from which the hydrogen is extracted for feeding the engine.

15. Apparatus according to claim 14 including means directing hydrogen stored in said reservoir to the engine for starting the engine prior to starting said reactor.

16. Apparatus according to claim 8 wherein said first and second hydride tanks are situated on said vehicle behind the engine and extend trasversely thereof and wherein each tank has a bottom in the form of a hopper.

17. Apparatus according to claim 16 including a double connection used for filling and emptying the hydride, one portion of the connection communicating with the top of the first tank for charging this tank with fresh hydride under gravity, with other portion of the connection communicating with the bottom of the second tank for emptying spent hydride from this tank by suction.

18. In a motor vehicle propulsion system including an internal combustion engine, and apparatus for generating gaseous hydrogen from a metal hydride and feeding the hydrogen as fuel to the engine during operation of the vehicle, said apparatus comprising a low-capacity reactor, first and second tanks, means for feeding fresh hydride to said reactor from said first tank, means for removing spent hydride from said reactor and conveying it to said second tank, pressure sensing means for sensing the hydrogen pressure in said reactor, said means for feeding fresh hydride to said reactor and said means for removing said spent hydride from said reactor being controlled by said pressure sensing means, heating means for heating the hydride in said reactor, said heating means including heat exchanger means operably connected to the engine's exhaust system for extracting heat from the exhaust gases and means flowing gaseous hydrogen through said heat exchanger means to pick up heat from the engine exhaust gases, means directing said heated hydrogen gas through the hydride in said reactor to assist in the fluidization of the hydride, and means for extracting the hydrogen from said reactor and directing the extracted hydrogen to said internal combustion engine.

19. In a motor vehicle propulsion system including an internal combustion engine, an apparatus for generating gaseous hydrogen from a metal hydride and for feeding the hydrogen as fuel to the engine during operation of the vehicle, said apparatus comprising a low-capacity reactor, first and second tanks, means for directing fluidizing currents of hydrogen gas into the hydride in said first tank and in said reactor, centrifical pump means for pumping fresh hydride from said first tank and for removing spent hydride from said reactor and conveying it into said second tank, means for heating the hydride in said reactor including a pump for circulating hot hydrogen through the bed of hydride in the reactor, said pump for circulating hydrogen having its inlet pipe connected through a valve to the gas space in one of said tanks whereby upon opening of the valve as when the engine of the vehicle stops, a current of cold hydrogen is sent from the one tank through the hydride in the reactor to thereby quickly cool the hydride, and means for extracting the hydride from said reactor and directing the extracted hydrogen to said internal combustion engine.

* * * * *